United States Patent [19]
Kreutzfeld

[11] Patent Number: 4,823,367
[45] Date of Patent: Apr. 18, 1989

[54] METHOD AND APPARATUS FOR AUTOMATIC LAP COUNTING

[75] Inventor: Robert J. Kreutzfeld, Rochester, Mich.

[73] Assignee: Rikagaku Kenkyujyo and Hochiki Corp., Tokyo, Japan

[21] Appl. No.: 83,514

[22] Filed: Aug. 7, 1987

[51] Int. Cl.⁴ .............................................. G01C 22/00
[52] U.S. Cl. ...................... 377/24.2; 377/5; 455/344; 340/556; 340/565
[58] Field of Search ............ 377/24.1, 24.2, 5; 340/992, 993, 988, 556, 565; 455/39, 70, 344

[56] References Cited

U.S. PATENT DOCUMENTS

| | | | |
|---|---|---|---|
| 3,492,582 | 1/1970 | Heywood | 455/39 |
| 3,580,496 | 5/1971 | Neild | 377/24.1 |
| 4,371,945 | 2/1983 | Karr et al. | 377/24.2 |
| 4,578,769 | 3/1986 | Frederick | 377/24.2 |

Primary Examiner—John S. Heyman
Attorney, Agent, or Firm—Wenderoth, Lind & Ponack

[57] ABSTRACT

The present invention provides a method and apparatus for counting the number of occurrences that a mobile unit comes within range of a stationary unit. The invention is useful in counting the number of laps which a runner or swimmer completes through a course. In one aspect, the present invention includes a timer which, in cooperation with the information generated by the lap counter, produces information corresponding to the lap time, average minutes per mile and other such data. In a preferred embodiment, a stationary transmitter emits an infrared signal to create a zone of detection which triggers a receiving unit attached to the runner or swimmer each time the runner or swimmer passes through the zone of detection.

14 Claims, 2 Drawing Sheets

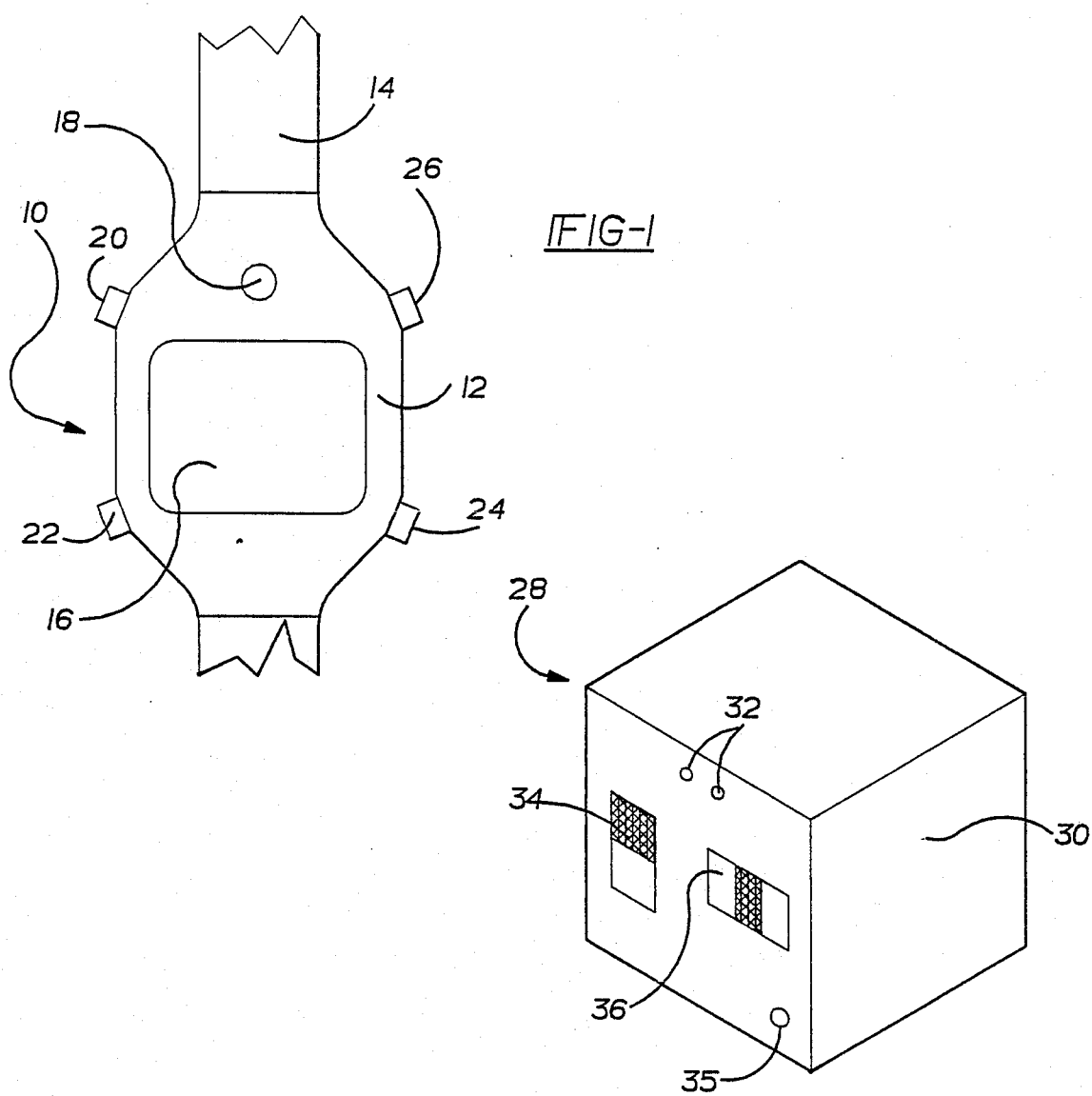
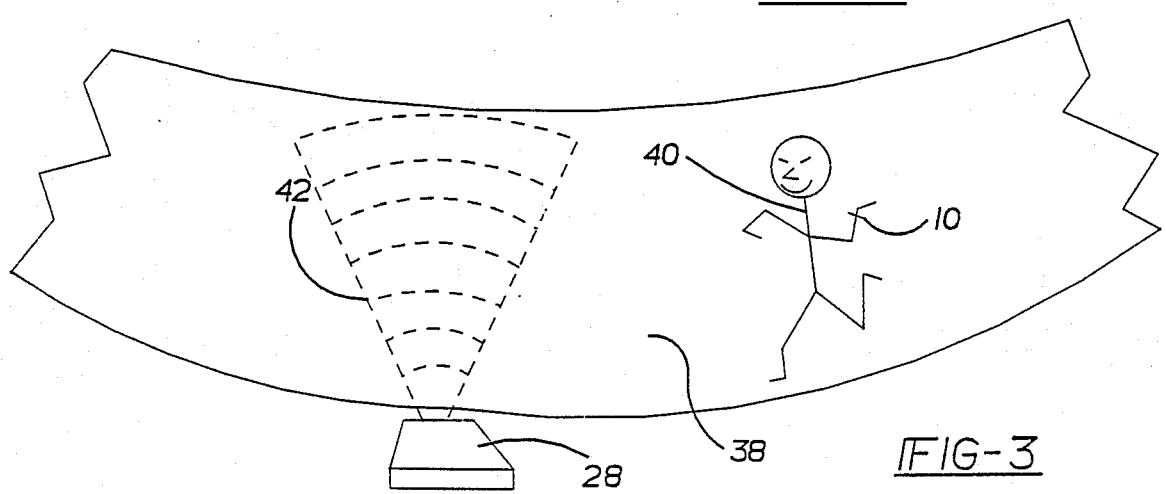

METHOD AND APPARATUS FOR AUTOMATIC LAP COUNTING

FIELD OF THE INVENTION

The present invention relates generally to methods and apparatus for determining the number of laps or lap increments completed by an individual such as during athletic training or competition. More specifically, the present invention relates to a method and apparatus by which laps or lap increments can be counted automatically.

BACKGROUND OF THE INVENTION

In many sporting events and exercises, an athlete repetitively passes a reference point by which distance is measured. A common example of one such activity which has recently gained widespread attention and participation by the public is running. Running has become an integral part of most exercise programs and provides an excellent means for attaining physical fitness. Swimming is another activity which provides good heath benefits including cardiovascular conditioning. Still another activity that has gained recent popularity is the triathalon which combines running, swimming and biking. Frequent walking is also an excellent exercises. As the clincial evidence supporting the link between exercise, good health and longevity increases, so does the number of individuals who run and swim frequently. Physicians and physical therapists commonly designate running and swimming as preferred treatment modalities for victims of cardiovascular accidents and to rehabilitate patients suffering from neurological deficits.

Many athletes run on a circular or oval track which may be located outdoors or housed in a health club or sports arena. In particular, the number of health club tracks and pools has increased greatly to facilitate running and swimming during inclement weather. The length of the track is generally known and most tracks are configured so that an integral number of laps around the track equals a standard unit of distance such as a mile or a kilometer. For example, a one mile (1760 yards) swim in a standard pool equals thirty-five laps or seventy lengths. On a typical indoor running track, a runner must complete eleven laps for a mile run. During training, 10 K runners generally run from three to fewer miles which may require as many as forty or fifty laps. Of course, at any one time multiple runners may be present on the same track. The reference point by which the runner passes on each trip around the track is generally referred to as the start or finish line. In a designated run of one mile on a track having a lap length of one quarter mile, the runner may refer to a single lap as a quarter mile split or simply a "split." When attempting to complete the run within a predetermined time period, a runner may develop a strategy based on completing the splits within a target time. Thus, a runner can set a pace based on achieved and predicted time goals.

Swimmers, particularly those who swim in a pool, swim laps in the pool lanes which extend from end-to-end of the pool. A swimmer begins at one end of the pool, swims to the other end and then turns to return to the starting point. This is generally considered to be a single lap. Again, as in running, the pool is structured such that a single lap is a predetermined distance such as 20 meters. Hence, a hundred meter swim may consist of five 20 meter laps. Each lap may be considered a split. In competitive running and swimming, the number of laps a contestant completes in a race and the elapsed time is determined by the officials who simply count the number of laps completed and measure the elapsed time with a stopwatch. During training, coaches or trainers may take these determinations. In some instances, the lap count and elapsed time may be conveyed to the athlete using hand-signals or the like. By keeping track of the number of laps completed, trainers remove this burden from the runners. In swimming events, the ends of the pool may be equipped with pressure plates which, when depressed by the swimmer during the turn, "count" the lap. These "touch pads," as they are commonly referred to, are discrete units which register contact of only a single swimmer. Touch pads are generally used only during swim meets and, in long swims, in conjunction with manual lap counting. However, the information provided by touch pad contact is generally not available to the swimmer during the swim unless the pads are linked to a large display.

While the aforementioned limited information may be made available to an athlete during an athletic meet or possibly during training when a trainer is present, usually a runner or swimmer is left to his own accord to count the number of laps completed and measure the elapsed time. Hence, in most settings an athlete is left to his own devices to determine this information. Therefore, most runners and swimmers attempt to mentally tally the number of laps completed. If the athlete also has a watch or a stopwatch, the elapsed time for the total run and possibly for each split may be calculated. However, as runners and swimmers will appreciate, even slight distractions may cause one to lose count of the number of laps comopleted or the precise time at which a particular split was started or finished. Others in the past have attempted to assist athletes in counting laps, estimating distance travelled and determining elapsed time through various devices including hand-held counters, pacing timers, pedometers, and wrist-worn stopwatches.

Hand-held counters are generally mechanical devices having a plunger which is depressed by a runner as he passes a reference point each lap around the track. That is, the counter is held in the runner's hand throughout the run and the plunger is depressed once for each lap. Some electronic versions of manually activated hand-held counters are known. Provided the runner remembers to register the lap, these hand-held counters generally give an accurate indication of the number of laps completed. Most are provided with a simple mechanical display. While hand-held counters may be suitable for some purposes, they can only provide very limited information and require the participation and thus concentration of the athlete. Some runners have stated that the act of holding and depressing the plunger on a hand-held counter produces arm cramps and associated shoulder and neck tension during long runs and interferes with their concentration. Moreover, since swimming requires the use of the hands to displace water, hand-held devices are impractical. Therefore, it would be desirable to provide an automatic method of counting laps which does not require a hand-held device or the deliberate interaction of the athlete.

Pacing timers, such as that shown in U.S. Pat. No. 4,285,041 to Smith, simply generate an audible tone or "stride tone" at preselected intervals. The runner is "paced" by the periodic tone which the runner attempts to match by each stride or every other stride. Pedometers estimate distance walked based on a programmed stride length for a given individual. In combination, the features of pacing timers and pedometers may yield estimated information of distance completed and elapsed time. However, as will be appreciated by those skilled in the art, this information is often inaccurate and the methods are quite inflexible. Similarly, while stopwatches give accurate information concerning elasped time, they require the deliberate interaction of the runner and area again generally impractical for swimmers. Therefore, it would be desirable to provide a method and apparatus for automatically counting laps. It would also be desirable to provide such a method and apparatus which automatically determines elapsed time.

In U.S. Pat. No. 3,478,344 to Schwitzgebel, an electronic system for behavioral supervision is disclosed which includes a wrist unit and transceiver to be worn by an individual. The wrist unit includes a modulated oscillator and two battery compartments. A central station is provided which interrogates the transceiver. In response to a coded interrogating signal from the central station, the transceiver transmits a response for location and indentification purposes. The wrist unit includes a code generator oscillator unit and the transceiver is responsive to the wrist carried oscillator. U.S. Pat. No. 4,151,407 to McBride et al. discloses a low power infrared information transmission system having a portable transmitter which emits a modulated infrared light beam. As disclosed, the device is used to control a video game or T.V., to provide a communications link for a portable microphone or telephone set, or to transmit medical information from medical electrodes affixed to a patient.

In U.S. Pat. No. 4,156,190 to Chirbeadre et al. at electronic odometer and speedometer for bicycles is disclosed. The device computes distance and speed based upon input signals generated by the interruption of a light beam by each spoke and the valve stem of a bicycle wheel. Other methods of transmitting information via light beam which will be known to those skilled in the art may also be useful in the present invention. In U.S. Pat. No. 4,225,953 to Simon et al. a personnel locater and display system which indicates the room numbers in which individuals are located at a given moment is disclosed. The device includes small, ultrasonic or radio frequency portable transmitters that are worn by the individuals to be monitored. Corresponding receivers are positioned in each of the rooms to be monitored.

U.S. Pat. No. 4,275,385 to White teaches an infrared personnel locater system which includes a transmitter unit which is worn by the person to be identified. The portable infrared transmitter units emit a coded infrared signal and the signal is keyed to a particular individual. A receiver mounted above an entry way such as a door is provided to detect the coded infrared signal to identify an individual. In U.S. Pat. No. 4,309,599 a pacing timer is set forth which includes a transducer that is disclosed as a pressure transducer in the heels of jogger's shoes. The pressure transducer is activated each time a jogger takes a step. A pacer emits an audible tone each time the jogger's pace exceeds or falls below a preselected pace.

U.S. Pat. No. 4,325,146 to Lennington discloses an object identification system wherein a transponder is mounted on an object such as an automobile. A corresponding interrogator is mounted on the entry way of a parking structure or the like. A light pulse from the interrogator is received by the mobile transponder which in turn emits a coded light signal that is received by the interrogator for the purpose of identifying the mobile unit. If identification is made, it is suggested that the interrogator can then respond by lifting a gate to allow a vehicle to enter the parking structure. U.S. Pat. No. 4,330,870 discloses an optical data link for data communication using a modulated light beam.

Finally, U.S. Pat. No. 4,601,064 to Shipley discloses an infrared pulse communication system for determining the location of a person or object. A plurality of portable transmitter each generating automatically and repetitively a unique signal consisting of pulses of infrared radiation are provided along with a plurality of fixed receivers positioned to cover different areas of a facility. Each of the receivers is capable of sensing and storing the signal generated by the transmitter. This system is designed for locating personnel at large facility.

None of the aforementioned patents disclose or suggest a method or apparatus for automatically counting laps.

SUMMARY OF THE INVENTION

In accordance with the present invention, there is provided a method and apparatus for automatically counting the number of laps or lap increments completed by an individual which includes a mobile unit worn by the athlete and a corresponding stationary unit which is placed near the perimeter of a course. As the individual wearing the mobile unit passes through a designated zone of detection, a signal is conveyed between the mobile unit and the stationary unit and registers the completion of a lap. The number of laps completed is then displayed to be viewed by the individual. Thus, the present invention provides a method an apparatus by which a person can automatically determine the number of laps completed during a run or swim or other similar activity.

In one embodiment of the present invention, the stationary unit transmits an infrared signal to provide the zone of detection. The mobile unit in this embodiment includes an infrared receiver in the configuration of a wristband which is worn by the individual. As the individual passes through the infrared zone of detection, the wristband receiver detects the infrared signal emitted by the transmitter and generates a character which is displayed by the receiver unit. The lap count is then stored in data storage provided in association with the receiver unit. Upon each successive pass through the zone of detection, the completion of another lap is detected and added to the stored data. Thus, a running total of laps completed is computed and displayed.

In another aspect, the present invention includes a form of signal modulation such as pulse-code modulation or the like whereby the infrared signal which is relayed between the transmitter and receiver is coded such that the receiver detects only a preselected coded signal. This feature significantly reduces interference due to background infrared electromagnetic radiation. In still other embodiments of the present invention, additional information such as elasped time, estimated completion time and the like are also determined.

Therefore, it is an object of the present invention to provide a method by which laps can be counted automatically.

It is a more specific object to provide a method and apparatus for automatically counting laps which utilizes an infrared light beam. It is still a further object of the present invention to provide a method and apparatus for counting laps which includes a first microelectronic infrared device which is worn by an individual, a second microelectronic infrared device which is placed in a stationary position along the perimeter of a track, pool or the like, and means for sensing, storing and displaying information relation to the number of laps completed by the individual during running, swimming or other similar activity.

Other objects and advantages of the present invention will become apparent upon reading the following detailed description o the preferred embodiments and upon reference to the drawings and the appended claims. While the invention will be described in connection with the preferred embodiments, it is to be understood that the description of the preferred embodiments is not intended to limit the invention to any single embodiment and, on the contrary, it is intended to cover all alternatives, modifications and equivalences which may be included within the spirit and scope of the invention as defined by the appended claims.

BRIEF DESCRIPTION OF THE DRAWINGS

FIG. 1 is an elevational view of the mobile unit of the present invention attached to a conventional wristband.

FIG. 2 is a perspective view of the stationary unit of the present invention.

FIG. 3 diagrammatically depicts the method of the present invention for automatically counting laps wherein the mobile unit of the present invention is attached to the wrist of a runner and the stationary unit is positioned at the perimeter of a running track.

DETAILED DESCRIPTION OF PREFERRED EMBODIMENTS OF THE INVENTION

Figure 4:
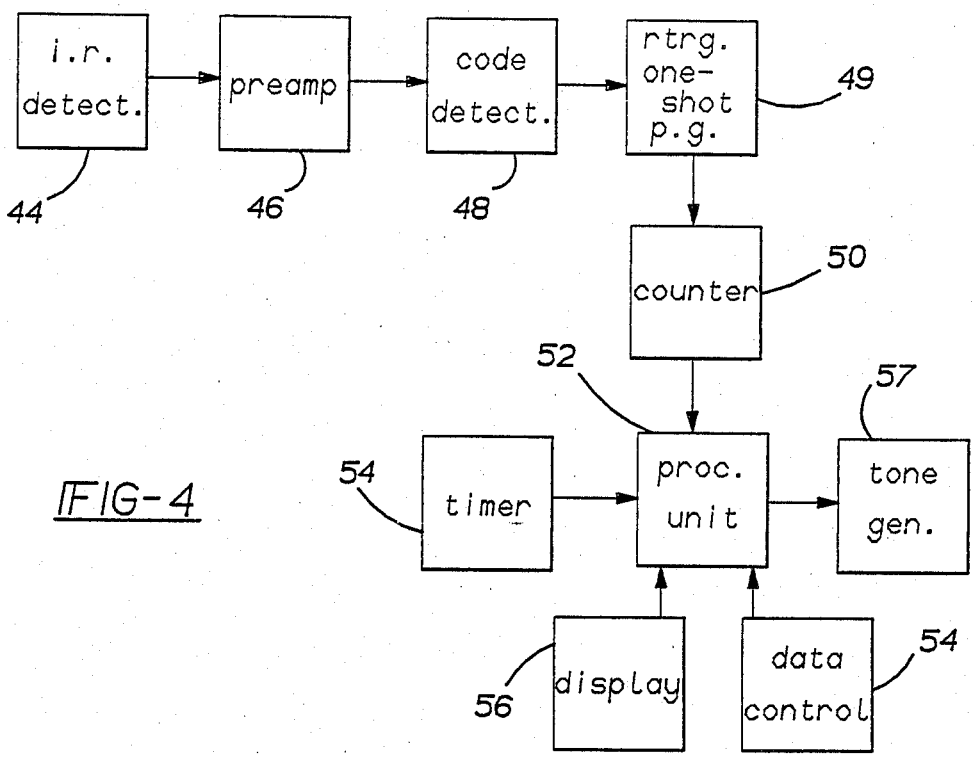
FIG. 4 is a block diagram of one arrangement of the receiver of the present invention.

Referring now to FIG. 1 of the drawings, mobile unit 10 is shown generally having a watch-like housing 12 which is attached to wrist band 14. Housing 12 is provided with a display 16 by which information is displayed during use. In this embodiment of the present invention, mobile unit 10 is the receiving unit which detects an infrared light beam at infrared (IR) detector 18 shown here mounted in housing 12. Numerous photoelectric detectors which detect electromagnetic radiation in the infrared band are currently available that are suitable for use as infrared detector 18. Similarly, various means are available by which characters may be displayed at display 16 including light emitting diode display units and liquid crystal displays. Due to their flexibility and low power consumption, liquid crystal displays are preferred for use herein. It is to be understood that although in this embodiment of the present invention, mobile unit 10 is shown as a receiver unit mounted on a wristband, it may be desirable in some applications to make mobile unit 10 the transmitter of the present invention or to provide other means of attachment to an individual than the illustrated wristband. Moreover, the relative position of display 16, body 12, and infrared detector 18 may be quite different than the configuration illustrated and these alternative arrangements are intended to come within the scope of the present invention. In those instances where it is desired that mobile unit 10 be used by swimmers, body 12 should be water-impervious.

Mounted around the periphery of body 12, are push-buttons 20, 22, 24 and 26. Push-buttons 20 through 26 are provided to allow the display of various information at display 16 and to program mobile unit 10 to perform preselected calculations. Information such as the total number of laps completed, the number of laps to go, the number of laps to be completed for a given distance such as a mile, the elapsed time, lap time, and estimated time to complete the run may be determined and displayed. Additional information such as the current time may also be provided where desired. It is also preferred that mobile unit 10 produce an audible conformation-of-lap beep which sounds to advise the athlete that he has completed a lap. A second audible tone can also be provided to advise the runner that all of the laps of the total run have been completed.

Referring again to FIG. 1 of the drawings, push button 20 is preferably used to activate the various displays or "pages" which, in the preferred embodiment, include at least two display pages. It will be known to those skilled in the art that the appropriate circuitry and software is easily designed to provide multiple displays in the manner described. That is, push-button 20 can be depressed to flip or switch the information displayed by display 16. In the preferred embodiment, the first or primary display includes a read-out of the number of laps completed, the elapsed time and estimated mile or kilometer time. Hence, in a one mile run around a quarter mile track, at the completion of two laps the following information would be displayed on the primary display: 2 (laps completed) 3.00 (minutes), 6.00 (minutes), where 2 is the number of laps completed, 3.00 is the time elapsed for the completion of 2 laps, and 6.00 is the time estimated for completion of the one mile run. The secondary display in this embodiment is then used to display the additional information such as laps-to-go, split time and the like.

Push-button 22 in this embodiment is used to program the number of laps in the run. Push-button 24 serves as the start/stop button. In the most preferred embodiment, push-buttons 20 through 26 have multiple functions such that they can be used to switch between modes as well as to cycle digits to program information regarding laps per mile and the like. For example, push-button 22 may also be used to manually register a lap count. Push button 26 is used to reset mobile unit 10. In other words, in order to zero the count and timer, one simply pushes push button 26. Mobile unit 10 may then be programmed in the manner previously described. The power source (not shown) for mobile unit 10 is preferably direct current provided by one or more batteries. Other power sources may be suitable in some applications.

Referring now to FIG. 2 of the drawings, stationary unit 28 is shown generally having housing 30. A plurality of openings are provided through which an infrared light beam is emitted by infrared light emitting diodes 32. An on/off power switch 34 is provided along with an AC power adapter receptacle 35 by which stationary unit 28 may be connected by a transformer to a wall outlet or the like. It is preferred that stationary unit 28 also include intensity switch 36 by which the intensity of the infrared beam emitted by infrared light emitting diodes 32 may be regulated. As illustrated, intensity switch 36 has three settings, high, medium and low.

Intensity swtich 36, by allowing the infrared light intensity to be increased or decreased, is used to change the depth of the detection zone. That is, for a low setting a subject must pass close to infrared light emitting diodes 32 and, accordingly, stationary unit 28, in order to register a lap. By increasing the intensity of the emitted light beam, intensity switch 36 allows the zone of detection to be enlarged such that a lap will be registered when mobile unit 10 is farther from stationary unit 28. The ability to regulate the intensity of the beam is an important feature of the present invention, particularly when the device is used to count laps in a pool. Intensity switch 36 allows the lap count to be accurately determined substantially at the end of the pool, or in running, substantially at the finish line. The high power setting also helps discriminate the beam over background radiation which will generally be present at high levels when the invention is used outdoors. In this regard, it may be desirable to provide a sensitivity regulator (not shown) in association with infrared light emitting diodes 32 of mobile unit 10 in order to vary a threshold of detection. Housing 30 in this embodiment encloses a power source (not shown) and, as with mobile unit 10, the preferred power source for operating stationary unit 28 is direct current. In most circumstances, batteries will be the most appropriate power source. Housing 30 also contains the necessary circuitry to link the various switches, power source and infrared light emitting diodes 32 to produce the vaious functions of stationary unit 28 as described herein and appropriate circuitry will be known to those skilled in the art.

Several significant advantages are obtained by designating mobile unit 10 as the receiver and stationary unit 28 as the transmitter. Significantly, by placing the receiver unit on the individual, the lap count and associated information is displayed by display 16 which can be conveniently and immediately read. Although a larger visual display could be provided as part of stationary unit 28, where stationary unit 28 is the receiver, such a display would have to be rather large and could only be viewed when the athlete is close to the display. Also, it will be appreciated by those skilled in the art that the transmitter in the present invention will generally require more power than the receiver. Thus, it may be difficult to miniaturize the transmitter while the receiver is quite easily miniaturized in the form illustrated in FIG. 1 of the drawings.

Turning now to FIG. 3 of the drawings, the method of the present invention for counting laps and determining associated information such as elapsed time is illustrated. In accordance therewith, track 38 is shown, here a typical oval-shaped running track. Stationary unit 28 is seen having been placed on the ground at the perimeter of track 38 by runner 40. Shown on the wrist of runner 40 is a somewhat exaggerated size is mobile unit 10. In this embodiment, stationary unit 28 is the transmitter of the infrared beam and mobile unit 10 is the receiver. As stated, the opposite arrangement may be desirable in some applications. In use, stationary unit 28 emits an infrared beam of light to form a cone of detection 42 which extends substantially across track 38. It may be necessary to align infrared light emitting diodes 32 of stationary unit 28 such that the infrared beam of light angles away from the track surface to reach the elevation of mobile unit 10. Proper communication between stationary unit 28 and mobile unit 10 when runner 40 passes through the zone of detection 42 is necessary.

Thus, in the method of the present invention an individual, shown here as runner 40, attaches mobile unit 10 to his wrist with wrist band 14 and places stationary unit 28 at an appropriate position relative to track 38 (or in the case of swimming, at an appropriate place at the end of the pool), such that infrared light emitting diodes 32 emit an infrared beam of light to form a zone of detection 42 through which runner 40 must pass as he runs around track 38. Similarly, in the case of a swimmer, stationary unit 28 must be positioned such that infrared light emitting diodes 32 project a zone of detection at the end of the pool lane through which the swimmer must pass in making his turn. Runner 40 then begins running around track 38. Each time runner 40 passes through the zone of detection 42, which will be the completion of a single lap, infrared light detector 18 senses the infrared beam and creates a signal which the circuitry counts as the completion of a single lap. In the most preferred embodiment, and as will be explained more fully, mobile unit 10 includes signal lock-out means such that immediately after a signal is detected, a second signal cannot be detected for a specified length of time after the signal fades away. This signal lock-out feature prevents a single lap from being counted more than once. Thus, on each successive pass through zone of detection 42, mobile unit 10 counts another lap. The total number of laps completed is compiled and stored by data storage means in mobile unit 10. In those embodiments which include a chronograph, calculations of total elapsed time, estimated mile time, split time, and the like are made. This information is then displayed conveniently at display 16 to be read by runner 40. Additional information can be calculated and displayed in this manner in those embodiments wherein mobile unit 10 includes means for multiple page display. Runner 40 can "flip through" the pages simply by pushing the appropriate pushbutton. It will be evident that there are a great number of uses of the present invention beyond the automatic lap counting of runners and swimmers. These other uses may include automatic lap counting for walking, bicycle racing, speed skating, and other such uses which all are intended to come within the scope of the present invention.

Referring now to FIG. 4 of the drawings, a block diagram illustrating one arrangement of the functional elements of mobile unit 10 is shown in that embodiment in which mobile unit 10 comprises the infrared receiving unit. IR light detector 44 is seen which corresponds to infrared detector 18 illustrated in FIG. 1 of the drawings. IR detector 44 includes a photo diode or the like which generates an electrical signal upon excitation by infrared light having a minimum threshold intensity. This electrical signal is then channeled into preamp 46 where it is amplified. Next, the amplified signal is channeled into code detector 48. Code detector 48 and a corresponding encoder in the transmitting unit of the present invention play an important role in an alternative embodiment of the present invention. For several reasons, it is preferred that the infrared light beam which forms zone of detection 42 shown in FIG. 3 be pulsed to form a recognizable code. It should also be pointed out that stationary unit 28, in the transmitter configuration, may be provided with one or more lenses to provide directional control over the emitted infrared light beam. These lenses (not shown) are integrated with housing 30 such that they cover infrared light emitting diodes. 32.

By transmitting the infrared beam in coded form, the erroneous "triggering" of infrared detector 18 due to background "noise" resulting from surrounding light sources is prevented. In addition, it may be necessary to transmit a coded beam in order to avoid interference between multiple transmitters and multiple receivers when the invention is used in the context of a health club running track or the like. Two forms of pulse code modulation suitable for use herein are pulse position modulation and pulse duration modulation. Other methods of transmitting information via light beam which will be known to those skilled in the art may also be useful in the present invention. As will be known to those skilled in the art, in pulse position modulation the time interval between pulses determines the code. In pulse duration modulation, it is the duration of the pulse which is used to designate the code. In the most preferred embodiment, the coded infrared signal is transmitted at a preselected frequency, for example 40kHz, which is recognized by the matched receiver. In other-words, in addition to encoding the infrared beam using pulse code modulation, it is preferred that the beam be emitted at a preselected frequency to better distinguish the signal over background radiation. Code detector 48 is sufficiently sensitive to discriminate between the different output pulse characteristics such that the only infrared beam detected is that produced by the corresponding transmitter. In one embodiment of the present invention, mobile unit 10 "learns" a code. In that embodiment, mobile unit 10 is placed within zone of detection 42 and, as a coded IR beam is received from the transmitter, mobile unit 10 is programmed by the beam to receive only a discrete code, that which is emitted by the transmitter. Hence, mobile unit 10 and stationary unit 28 by virtue of a coded IR light beam can be individualized for a single individual. Hence, it it preferred that the infrared beam comprise a pulse-code-modulation signal for the matched receiver. In order to conserve power consumption, the signal is emitted, for example, 20 times per second. Furthermore, it is preferred that the code information have a very short duration, also to conserve power consumption and thus batery life. For example, a coded signal having a duration of 20 to 30 milliseconds and a pulse width duration 10 to 15 microseconds would be suitable.

Turning again to FIG. 4, once code detector 48 detects a recognizable signal, retriggerable one-shot 49 is activated such that a single pulse is sent to pulse counter 50. After retriggerable one-shot 49 is activated in this manner, further detection of the signal transmitted by stationary unit 28 is precluded (lock-out) until such time that the signal is absent for a predetermined interval, for example, 5-10 seconds. Following the requisite lockout period, the signal can once again be detected on the next pass through the zone of detection whereby another lap is counted in the manner described. Thus, the signal lock-out feature ensures that an erroneous "double-lap" is not registered by mobile unit 10. This may occur when IR detector 18, referring now to FIG. 1 of the drawings, detects and registers the completion of the lap but then erroneously detects a second lap completion signal as runner 50 swings mobile unit 10 back into the zone of detection 42 as he leaves the zone or, where the IR signal is transmitted in rapid, intermittent fashion. Thus, the signal lock-out feature is activated once the lap is registered so that a second incoming signal cannot be registered or counted unless it is received more than a preselected interval after the first signal has faded out. The count data is then sent to a microprocessing unit 52 which is equipped with timer 54 so that elapsed time based calculations such as average minutes per mile can be determined. Also, in cooperation with processing unit 52 data entry and control module 54 is provided by which processing unit can be programmed with the previously described information such as total number of laps to be run, lap distance, run distance and other such information. Display 56, which corresponds to display 16 of FIG. 1, can be seen in communication with processing unit 52 and data entry and control module 54. Display 56 provides the means by which information generated by processing unit 52 and data entry and control 54 are displayed to be read by the athlete. Tone generator 57 is also provided to produce an audible tone corresponding to either the registering of a lap, the completion of the run, or both.

It is to be understood that many peripheral components can be added in addition to those described and illustrated in FIG. 4.

Figure 5:
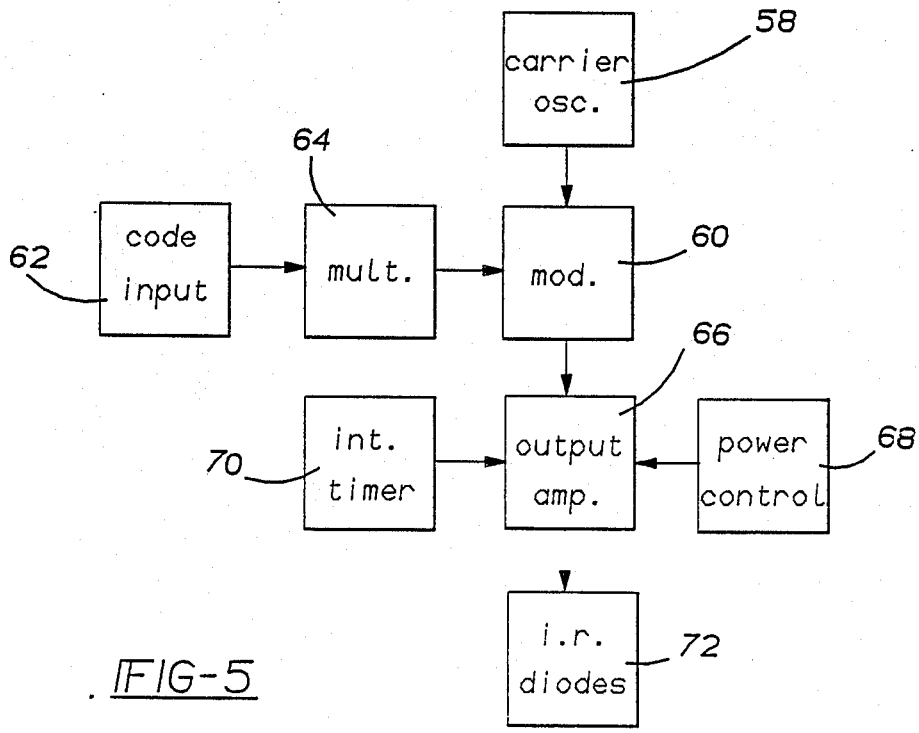
FIG. 5 is a block diagram of one arrangement of the transmitter of the present invention.

Referring now to FIG. 5 of the drawings, one possible configuration of stationary unit 28 in that embodiment wherein stationary unit 28 is the transmitter is depicted. In this embodiment, carrier oscillator 58 is shown the output of which is channeled into modulator 60. In the most preferred embodiment, carrier oscillator 58 generates a signal having a preselected frequency such as a 40kHz square wave. Code input 62 is provided with a dedicated code or, as explained previously, code input 62 may be programmable by the user. By providing a signal which is identifiable through a unique pulse code and a predetermined frequency, unwanted signals from background radiation or other transmitters can be readily distinguished. The output from code input 62 is channeled to multiplexer 64 the output of which is fed into modulator 60. The modulated signal is then sent to output amplifier 66 which is controlled by power control 68 to provide the various intensities of the infrared light beam so that the zone of detection can be adjusted as described. An interval timer 70 to conserve power consumption is also provided. Again, interval timer 70 may be preprogrammed with dedicated circuits, or alternatively, have a programmable feature such that the interval can be programmed by the user. Finally, the signal from output amplifier 66 is fed to infrared light emitting diodes 72.

In still another embodiment of the present invention, it may be suitable in the context of a health club or the like to provide a single permanently mounted transmitter in the fashion of stationary unit 28 and to then supply runners and swimmers with corresponding mobile units 10. Mobile unit 10 can be provided with an open mode which detects any transmitter and a closed mode which will respond to an individualized coded signal. In this way, a user can use mobile unit 10 for communication with its corresponding stationary unit 28, or, alternatively, with a common transmitter. Furthermore, in the context of an indoor running track the infrared beam may be reflected, distorting the zone of detection. In order to obtain more accurate lap counting, an ultrasonic ranger may be provided in connection with the transmitter such that the transmission of the infrared beam could be delayed until a minimum range is determined by the ultrasonic ranger. A more accurate, consistent split time measurement is thus determined. It should also be pointed out that while the preferred embodiment of my invention relies on the transmission of an infrared light beam, other methods of providing communication between the receiver and transmitter such as ultrasonic means, radio frequency, or visible light may be suitable in some applications. It may also be possible and desirable to integrate a voice synthesis module into the receiver of the present invention so that the user does not have to view the display in order to obtain the information provided by the invention. Finally, it may be suitable in some applications to provide both mobile unit 10 and stationary unit 28 with transponder capabilities.

Therefore, the present invention provides a method for automatically counting the number of occurrences that a mobile unit comes within range of a stationary unit by transmitting a signal between the mobile unit and the stationary unit with a transmitter in association with either the mobile unit or the stationary unit, periodically detecting the transmitted signal with a receiver in association with either the mobile unit or the stationary unit (whichever unit does not have the transmitter) only when the mobile unit comes within range of the stationary unit, and registering a count of 1 using counting means in association with the receiving unit. The present invention also provides an automatic counter for determining the number of occurrences that a mobile unit comes within range of a stationary unit wherein the automatic counter includes a transmitter for generating and transmitting a signal between the mobile unit and the stationary unit, a receiver for periodically detecting the signal when the mobile unit comes within range of the stationary unit, and a counting means in association with the receiver for counting the number of occurrences the receiver detects the signal from said transmitter.

Thus, it is apparent that there has been provided in accordance with the invention a method and apparatus that fully satisfies the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modificatins and variations that fall within the spirit and broad scope of the appended claims.

What is claimed is:

1. A device which allows an individual in a recurring event to automatically count the number of times that said person passes within range of a stationary point on a recurring event path such that each pass by said person is counted as one event, said device comprising:
    a receiver having means for attaching said receiver to a person, said receiver further having photoelectric detector means for detecting an infrared light beam and means for counting discrete detection signals;
    an infrared light beam transmitter for placement at said stationary point, said infrared light beam transmitter having means for pulse encoding an infrared light beam; and
    in association with said receiver, time-delay, lock-out means for locking out detection of said infrared light beam for a predetermined interval after said signal can no longer be detected by said receiver.

2. The device recited in claim 1, wherein said signal is encoded.

3. The device recited in claim 1, wherein said means for counting includes data storage means for storing data corresponding to said number of said events.

4. The device recited in claim 1, further including timing means for determining the time intervals between said events.

5. The device recited in claim 1, further including display means in association with said counting means for displaying at least one character corresponding to said number of events counted by said counting means.

6. A method for an individual in a recurring event activity to automatically count the number of times that said individual passes within range of a stationary point on a recurring event path such that each pass by said individual is counted as one event, said method comprising the steps of:
    attaching a receiver to said individual, said receiver having photoelectric detector means for detecting an infrared light beam;
    placing an infrared light beam transmitter at said stationary point by which said individual to which said receiver is attached passes with said range;
    positioning said transmitter such that said transmitted infrared light beam is directed to form a zone of detection which extends from said transmitter at least as far as said range, said transmitted infrared light beam having an intensity within said zone of detection sufficient to be detected by said receiver once said receiver is spaced from said transmitter within said range;
    periodically passing said individual and said attached receiver within said range of said transmitter and through said zone of detection;
    sensing the presence of said infrared light beam as said individual having said attached receiver passes within said zone of detection by detecting said infrared light with said photoelectric means to produce a discrete detection signal each time said individual passes through said one of detection;
    determining the number of separate events that said detector has been sensed within said one of detection by counting said discrete detection signals with a counting means in association with said receiver; and
    displaying the number of separate events countered by said counting means with a display means.

7. The method recited in claim 6, wherein said infrared light beam is encoded.

8. The method recited in claim 6, further including the step of timing the intervals between said occurrences and displaying said time intervals.

9. The method recited in claim 6, further including the step of locking out detection of said infrared light beam for a predetermined interval once said signal can no longer be detected by said receiver.

10. A method for an individual in a recurring event activity to automatically count the number of times that said individual passes within a range of a stationary point on a recurring event path such that each pass by said individual is counted as one event, said method method comprising the steps of:
    attaching an infrared light beam transmitter to said individual;
    placing a receiver at said stationary point by which said individual to which said transmitter is attached passes within said range, said receiver having photoelectric detector means for detecting an infrared light beam;
    positioning said receiver such that said receiver is directed to a zone which extends from said receiver at least as far as said range, said transmitted infrared light beam having an intensity within said zone sufficient to be detected by said receiver once said transmitter is spaced from said receiver within said range;

periodically passing said individual and said attached transmitter within said range of said receiver and through said zone;

sensing the presence of said infrared light beam as said individual having said attached transmitter passes within said zone by detecting said infrared light with said photoelectric detector means to produce a discrete detection signal each time said individual passes through said zone;

determining the number of separate events that said transmitter has been sensed within said zone by counting said discrete detection signals with a counting means in association with said receiver; and displaying the number of separate events counted by said counting means with a display means.

11. The method recited in claim 10, wherein said infrared light beam is encoded.

12. The method recited in claim 10, further including the step of timing the intervals between said occurrences and displaying said time intervals.

13. The method recited in claim 10, further including the step of locking out detection of said infrared light beam for a predetermined interval once said signal can no longer be detected by said receiver.

14. A device which allows a person in a recurring event to automatically count the number of times that said person passes within range of a stationary point on a recurring event path such that each such pass by said person is counted as one event, said device comprising:

an infrared light beam transmitter having means for attaching said transmitter to a person, said infrared light beam transmitter further having means for pulse encoding an infrared light beam;

a receiver for placement at said stationary point, said receiver having photoelectric detector means for detecting an infrared light beam and means for counting discrete detection signals; and said receiver further having time-delay, lock-out means for locking out detection of said infrared light beam for a predetermined interval after said signal can no longer be detected by said receiver.

* * * * *

UNITED STATES PATENT AND TRADEMARK OFFICE
CERTIFICATE OF CORRECTION

PATENT NO. : 4,823,367

DATED : April 18, 1989

INVENTOR(S) : Robert J. Kreutzfeld

It is certified that error appears in the above-identified patent and that said Letters Patent is hereby corrected as shown below:

ON THE TITLE PAGE:
There is no Assignee in this case. Please delete Assignee: Rikagaku Kenkyujyo and Hochiki Corp., Tokyo, Japan The Attorney, Agent, or Firm should be Dykema Gossett not Wenderoth, Lind & Ponack.

In column 12, line 19, please delete "with" and add --within--; in line 36, delete "one" and add --zone--; in line 38 delete "one" and add --zone--.

Signed and Sealed this

Nineteenth Day of December, 1989

Attest:

JEFFREY M. SAMUELS

*Attesting Officer*     *Acting Commissioner of Patents and Trademarks*